US005659521A

United States Patent [19]

Amano

[11] Patent Number: 5,659,521

[45] Date of Patent: Aug. 19, 1997

[54] ELECTRONIC WATCH WITH MULTIPLE FUNCTION DISPLAY

[75] Inventor: Kazuhiko Amano, Suwa, Japan

[73] Assignee: Seiko Epson Corporation, Tokyo, Japan

[21] Appl. No.: 374,552

[22] PCT Filed: May 20, 1994

[86] PCT No.: PCT/JP94/00817

§ 371 Date: Mar. 20, 1995

§ 102(e) Date: Mar. 20, 1995

[87] PCT Pub. No.: WO94/28469

PCT Pub. Date: Aug. 12, 1994

[30] Foreign Application Priority Data

May 21, 1993 [JP] Japan .................................... 5-120237

[51] Int. Cl.$^{6}$ .......................... G04B 47/00; G04B 19/24; G06F 15/00

[52] U.S. Cl. ................................ 368/10; 368/28; 368/29; 368/80

[58] Field of Search .......................... 368/10, 28, 40–43, 368/76, 80; 235/74, 78, 83, 88; 364/413, 705, 710, 413.01, 413.02, 413.03, 413.05

[56] References Cited

U.S. PATENT DOCUMENTS 4,059,952 11/1977 Kaestner .
4,101,962 7/1978 Hakata .................................. 364/413
4,184,202 1/1980 McCrae .................................. 364/413
4,240,153 12/1980 Merritt .................................. 368/28
4,551,620 11/1985 Rashev .................................. 176/299

FOREIGN PATENT DOCUMENTS 53-77675 7/1978 Japan .
57-192892 11/1982 Japan .
57-196182 12/1982 Japan .
58-110884 7/1983 Japan .
62-32429 7/1987 Japan .
63-38672 8/1988 Japan .
64-10861 2/1989 Japan .
1178888 7/1989 Japan .

*Primary Examiner*—Vit W. Miska
*Attorney, Agent, or Firm*—Mark P. Watson

[57] ABSTRACT

An electronic watch with a multiple function display which is able to display biorhythms or the like in a format appealing to the sense of sight is presented. This electronic watch moves a plurality of hands by means of a plurality of step motors, and displays the biorhythms with the respective hands. Since the respective hands go through a single rotation when the corresponding step motor performs a set number of steps, in order to ensure that these single rotations are accurately timed with the periods of the biorhythms, movement control of the step motors is conducted.

4 Claims, 15 Drawing Sheets

ELECTRONIC WATCH WITH MULTIPLE FUNCTION DISPLAY

BACKGROUND OF THE INVENTION

1. Technical Field of Invention

The present invention relates to an electronic watch with a multiple function display having the ability to display information besides the time such as a biorhythm.

2. Background Art

Various types of watches which display biorhythms have been demonstrated. For example, those which digitally display the respective values of PSI (such as Japanese Patent Laid-Open No. Showa 64-10861), those which use curves and a cursor in order to show where in the cycle of PSI the current day falls (such as Japanese Patent Laid-Open No. Showa 62-32429), and those which display PSI on a graph.

However, when displaying the respective PSI rhythms by numerical values, there was the disadvantage that it was difficult to grasp the condition of the various rhythms, that is, whether they were in a downswing, an upswing, or a caution day.

On the other hand, those analog displaying the respective PSI with a long hand, short hand, and second hand of a watch displayed in a liquid crystal display device have been invented, but there was the problem of reduced visibility because the respective rhythms were displayed on the same character panel. Furthermore, there was the problem that flit was forgotten which hand corresponded to which rhythm, the condition of the biorhythm was absolutely unable to be known.

SUMMARY OF THE INVENTION

This invention, taking the above conditions into consideration, has as its objective the introduction of an electronic watch which has the ability to clearly display make easily comprehensible such information as a biorhythm.

The electronic watch with a multiple function display according to the present invention is provided with a plurality of hands for displaying according to their respective angles a plurality of rhythms, and a plurality of step motors for rotating said hands over a single cycle with the performance of the actions required for a respectivley set number of steps. Additionally, the present electronic watch with a multiple function display has a CPU for controlling each step motor, this CPU controlling the respective stop motors according to software such that a. each hand is rotated over a single cycle for each period of the rhythm corresponding to the hand, and b. when the value of each rhythm is at a certain value the position of each hand is a position corresponding to the value.

According to the present invention, the biorhythm is displayed by the position of a hand which is a means well suited to the sense of sight, and so it becomes easy to read and use this watch.

Other objects and attainments together with a fuller understanding of the invention will become apparent and appreciated by referring to the following description and claims taken in conjunction with the accompanying drawings.

DESCRIPTION OF THE PREFERRED EMBODIMENTS

First Embodiment

Below, an embodiment of the present invention will be explained with reference to the drawings.

A. Composition

Figure 1:
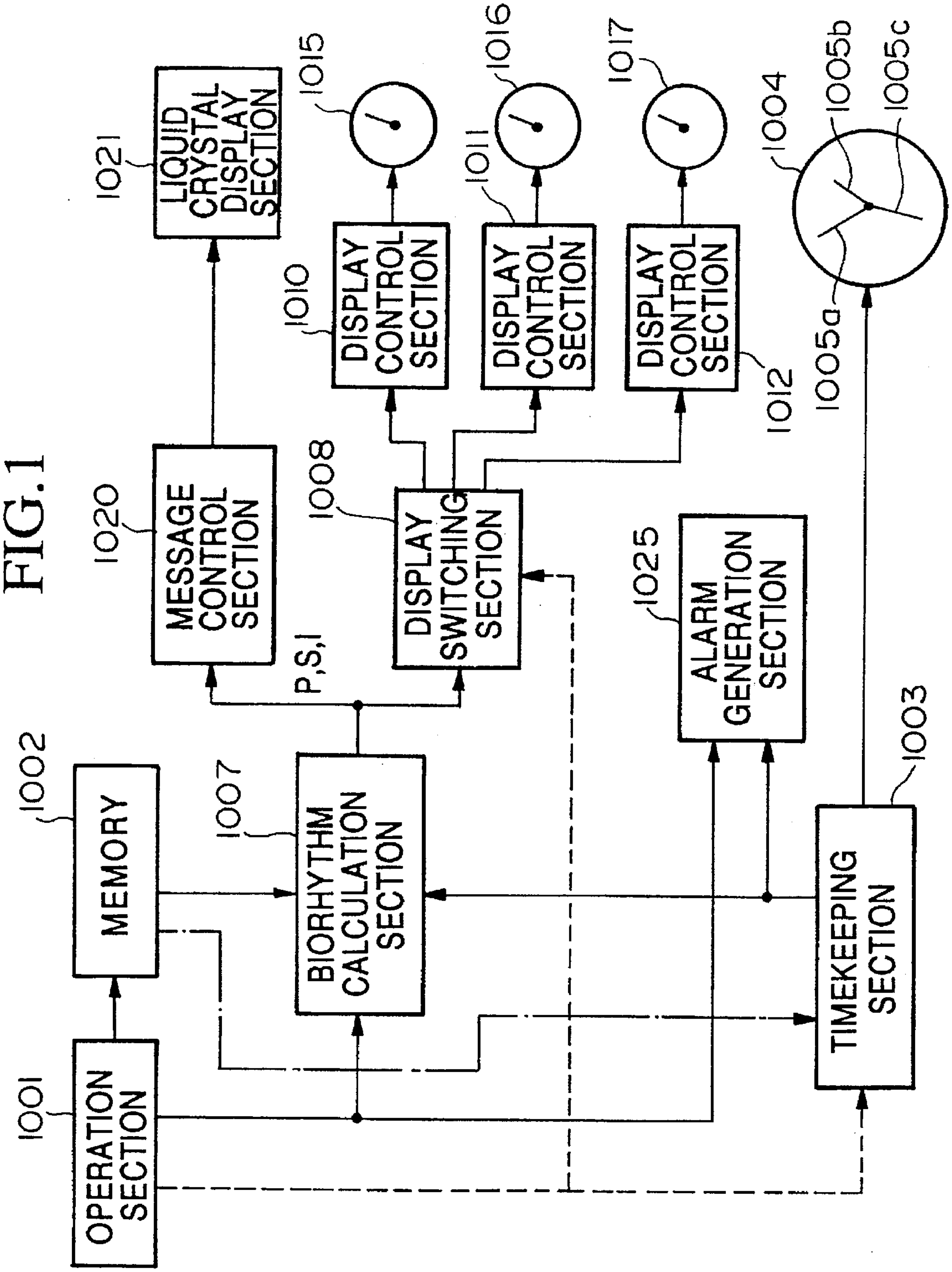
FIG. 1 is a block diagram showing the composition of a biorhythm display watch according to the first embodiment of this invention.

FIG. 1 is a block diagram showing the composition of the first embodiment of the present invention. This embodiment is an example of the present invention when applied to a wrist watch.

In FIG. 1, 1001 is an operation section where the operator performs various operations. This operation section 1001 is composed of input keys for the numerals 0–9, and and encoder for determining the input numeral, as well as allowing for the input of various commands according to the combinations of certain keys. Furthermore, each key is located on the upper side of the body between the character panel and the watchband.

1002 is a memory backed up by a battery, for storing birthday information entered from the operation section 1001. Concerning the birthday information, the year, month, and day and the hour, minute, and second are able to be stored. That is, when entering commands for the birthday information through the operation section 1001 (for example, by pressing the enter key and the "0" key simultaneously), the memory 1002 goes into write-in mode, and the information is entered from the operation section 1 in the order year-month-day-hour-minute-second. In this case, it is designed so that by pressing the enter key after entering the numerical values through the numerical value keys, it waits for the entry of the next item.

Next, 1003 is the timekeeping section, which, in addition to keeping track of the current time, controls the movement of the long hand 1005*a*, the short hand 1005*b*, and the second hand 1005*c* provided on the character panel 4. Furthermore, a crown for manually adjusting the positions of these hands is provided, its mechanism is within the scope of common knowledge, so its explanation will be omitted.

Furthermore, the timekeeping section 1003 is provided with a calendar function, such that if a year, month, and day (usually the date of commencement of use of the watch) are entered through the operation section 1001, the date is advanced every time midnight is passed. The current time information and the date information obtained in the timekeeping section 1003 are delivered to the biorhythm calculation section 1007.

Furthermore, if a certain operation is performed on the operation section 1001 (such as pressing the "8" and "9" numerical keys simultaneously), then the birthday information inside of the memory 2 is delivered to the timekeeping section 1003. Then, the timekeeping section 1003 activates the long hand 1005*a*, the short hand 1005*b*, and the second hand 1005*c*, and displays the time of birth.

The biorhythm calculation section 1007 uses the birthday information stored in the memory 2 as a reference time (the biorhythm start time) in order to determine the respective rhythm values of the physical body (P), the senses (S), and the intellect (I) corresponding to the present time and date given by the timekeeping section 1003. Because the respective rhythm values are the remainders after dividing the time of existence up to that time with the lengths of a single period of the respective rhythms, the biorhythm calculation section 1007 determines the respective rhythms by performing such a calculation. For this embodiment, the time of existence and the period lengths (the period lengths of P, S, and I are 23 days, 28 days, and 33 days respectively) are handled down to the second.

The respective PSI values output from the biorhythm calculation section 1007 are distributed to the display control sections 1010, 1011, and 1012 by the display selection section 1008. These display control sections 1010, 1011, and 1012 move the hands 1015*a*, 1016*a*, and 1017*a* of the small watches 1015, 1016, and 1017 according to the received PSI values. In this case, the display control sections 1010, 1011, and 1012 display the current value of the PSI by letting a single complete rotation of the hands 1015*a*, 1016*a*, and 1017*a* correspond to a single period of the respective PSI values. That is, the display control sections 1010, 1011, and 1012, for the PSI values, lets a single rotation of the hand correspond to 23 days, 28 days, and 33 days respectively, and moves the hands to the positions indicating the number of days passed within each period.

Figure 2:
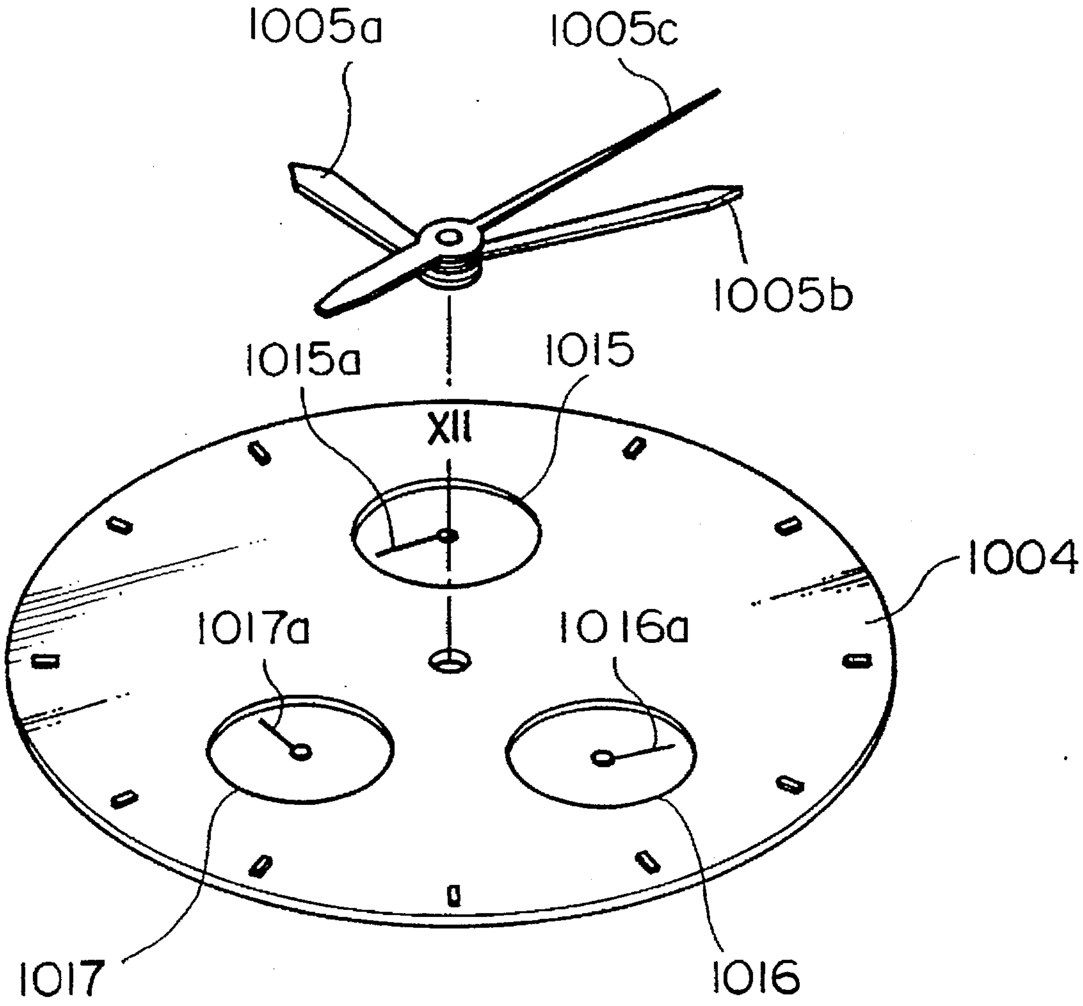
FIG. 2 is a diagonal view showing the positional relationship of the small watches in the same embodiment.

FIG. 2 shows the positional relationships between the small watches 1015, 1016, and 1017. As shown in FIG. 2, the small watches 1015, 1016, and 1017 are positioned so as to surround the watch hands, small watch 1015 is positioned at the upper portion of the character panel 1004, and the small watches 1016 and 1017 are respectively placed in the lower righthand and lower lefthand sections.

Additionally, the display selection section 1008 distributes P to the display control section 1010, S to the display control section 1011, and I to the display control section 1012 as long as there are no special instructions. Therefore, in the normal state, P is displayed on the small watch 1015, S is displayed on the small watch 1016, and I is displayed on the small watch 1017. In contrast, if a certain command is entered into the display selector section 1008 from the operation section 1001 (for example, by simultaneously pressing the enter key and the "0" key), the display selection section 1008 sends the PSI values to the display control sections 1010, 1011, and 1012 in the order of their effective strengths at that point in time. Thus, the rhythm with the strongest effect is displayed on the small watch 1015 on the upper portion of the character panel.

In such a case, the determination of which PSI rhythm has the strongest effect is made by a circuit which is pre-set within the display selection section 1008. For example, the respective PSI rhythms switch over from positive days to negative days every half period, the day of changing from positive to negative is called an extreme caution day, and the days before and after are called high caution days, so the determination of the order of the effective strength goes as extreme caution days, high caution days, and other days.

Next, 1020 is a message control section which chooses some pre-stored message data according to the respective PSI values and displays them on the liquid crystal display section 1021. For example, if one of the PSI rhythms is in a high caution day, then a message to the effect that the relevant rhythm is in a high caution day is displayed on the liquid crystal display section 1021.

1025 is an alarm generation section for generating an alarm sound, and the alarm time is able to be set through the operation section 1001. The alarm generation section 1025 compares the set alarm time with the current time being tracked by the timekeeping section 1003, and generates an alarm sound if the two agree. Furthermore, the alarm time set by the operation section is also delivered to the biorhythm calculation section 1007, and the biorhythm calculation section determines the respective PSI values corresponding to the set alarm time. Then the biorhythm values determined for the set alarm time are displayed on the small watches 1015, 1016, and 1017 when a command is entered from the operation section 1001 (for example, by pressing the "0" key and the "1" key simultaneously).

B. Actions

Next, the actions of the present embodiment according to the above composition are explained.

The operator, through the operation section 1001, enters birthday information into the memory 1002, and also enters the date of commencement of use into the timekeeping section 1003. As a result, the biorhythm calculation section 1007 calculates the biorhythm PSI corresponding to the current time, and this result is displayed in the small watches 1015, 1016, and 1017. Because the long hand 1005*a*, the short hand 1005*b*, and the second hand 1005*c* display the current time, by looking at the character panel, the operator is able to simultaneously deduce the present time and the biorhythm PSI.

In this case, the operator figures out the state of the respective PSI rhythms from the positions of the hands of the respective small watches 1015, 1016, and 1017, and furthermore, is able to instantly grasp the overall state of his biorhythm from the mutual relationships between the respective hands.

Additionally, by performing the appropriate operation on the operation section 1001, the hour, minute, and second of birth may be displayed by the short hand 1005*b*, the long hand 1005*a*, and the second hand 1005*c*. Thus, the operator is able to display his own time of birth at any given time.

C. Modification Examples

{1} In the embodiment, the time of birth was handled down to the second, but it is also possible to take it to the minute or the hour.

{2} It is also possible to construct so as to allow the changing of the display positions of the PSI values according to manual operations from the operation section 1. In this case as well, the liquid crystal display 21 displays which rhythm is displayed in which small watch.

Furthermore, in the embodiment, the small watches were switched according to the order of the amount of caution needed, but it is also possible to do the reverse and switch the small watches according to the degree of optimality of one's condition.

{3} The message display section 20, instead of displaying extreme caution days, may be made to display the days of optimal conditions.

{4} In the above embodiment, the alarm time was entered into the alarm generation section 25, but it may be constructed so as to input it by timing it with the dating information. Furthermore, in this case, it is possible to display the biorhythm of the input date on the small watches 15, 16, and 17 according to operation from the operation section 1001.

{5} It is possible to provide a bezel ring such as is used in diver's watches so as to allow, by the use of this ring, the knowledge of the time that has passed (or the time remaining) in a period of caution or a period of optimal conditions. In this case, it is also possible to allow for the determination of the number of hours until the occurence of a optimal period or a cautionary period, that is, to make forecasts.

Second Embodiment

Next an embodiment of a multiple function electronic watch having a plurality of display modes is explained.

A. Composition

(1) Outside Composition

Figure 3:
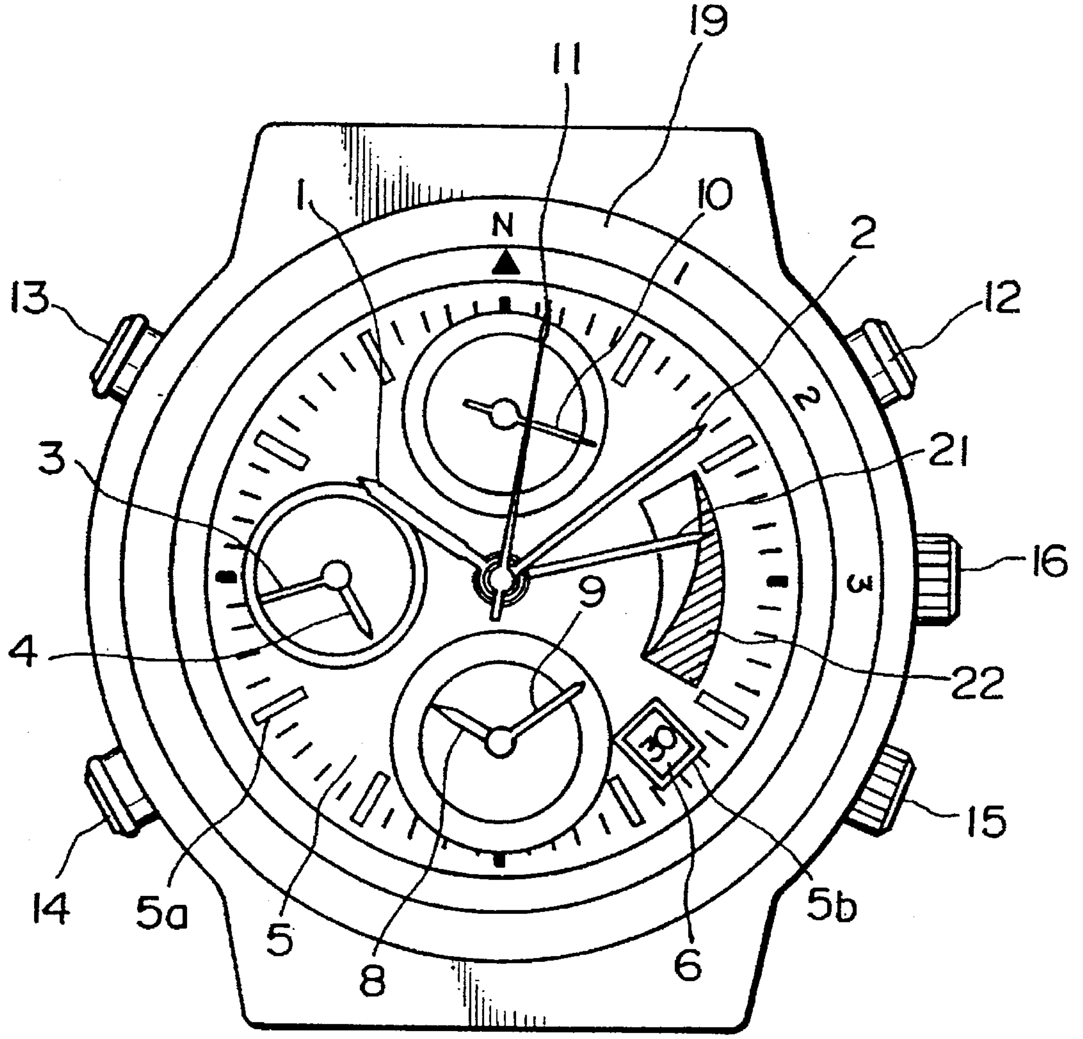
FIG. 3 is an outside view of the electronic watch with a multiple function display according to the second embodiment of this invention.

FIG. 3 is a planar diagram showing an outside view of the multiple function electronic watch of the second embodiment.

As shown in FIG. 3, this watch has four axes, in the center of the watch face, at the 6 o'clock position, at the 9 o'clock position, and at the 12 o'clock position, and has numerous types of hands which rotate around the respective axes.

First, an hour hand 1 and a minute hand 2 are provided in the centeral portion of the watch face, and a second hand and a 24 hour hand are provided at the 9 o'clock position, and the present time is displayed by these hands. Additionally, in the central portion of the watch face, a personal rhythm display hand 11 and a condition display hand 21 are provided. On the axis at the 6 o'clock position an alarm hour hand and an alarm minute hand for indicating the alarm time are attached. On the axis at the 12 o'clock position, a chronograph is attached which displays the results of a time measurement down to an accuracy of, for example, 1/5 second.

In addition, 5 is a character panel, which is provided with 12 hour type gradations **5*a* positioned to correspond with the hour hand 1 and a window 5*b* through which is able to be seen a day wheel for displaying a calendar. Furthermore, a condition display scale 22 is set into the character panel 5 on the inner side of the gradations 5*a* from 2 o'clock to 4 o'clock, and the appropriate position on the scale is pointed to according to the condition 21**.

Furthermore, 12 is the 2 o'clock button, 13 is the 10 o'clock button, 14 is the 8 o'clock button, 15 is the 4 o'clock crown, 16 is the 3 o'clock crown, and 19 is a bezel. These switch types are operated in the following way.

When the 4 o'clock crown 15 is in its normal position, the one-touch alarm mode is chosen, and it is possible to set the alarm up to twelve hours by moving the alarm hour hand 8 and the alarm minute hand 9 by units of minutes by pressing the 8 o'clock button 14. Furthermore, in such a case, if the 8 o'clock button 14 is continually pressed, then the alarm hour hand 8 and the alarm minute hand 9 advance acceleratingly, and the setting of the alarm time is possible in a short period of time.

Furthermore, if the 4 o'clock crown is pulled out one level, the daily alarm mode is chosen, and the setting of the daily alarm up to twelve hour units is possible by moving the alarm minute hand 9 and the alarm hour hand 8 by units of one minute by pressing the 8 o'clock button 14. An accelerated setting like the one previously described for the one-touch alarm mode is made possible by continually pressing the 8 o'clock button, and the alarm sound is made twice daily when the set time and the normal time agree. The normal time adjustment of the alarm hands is performed by pressing the 8 o'clock button 14 while the 3 o'clock crown 16 has been pulled out to the second level. Furthermore, when the second crown 15 is pulled out to the second level the time difference correction mode is chosen, and the alarm minute hand 9 and the alarm hour hand 8 are moved by units of one hour by pressing the 8 o'clock button, and in addition to the correction of time differences of the set alarm time, the individual correction of the hour hand 1 is possible by the rotation of the second crown 15.

The bezel ring 19 is attached rotatably to the circumference of the watch face. An encoder (not shown) is also provided which measures the rotational angle of the bezel ring 19.

(2) Hand Movement System

The watch according to the present embodiment is provided with six step motors M1–M6 (not shown) which are able to rotate in either direction, each step motor being composed of a coil wrapped around a magnetic core made of a material of high magnetic permeability, a coil block composed from a coil framework and a coil lead board processed so as to allow conductance on both ends thereof, a stator made of a material of high magnetic permeability, and a rotor assembled from a rotor magnet and a metallic block. Additionally, the six motors use the same parts for each rotor. These six rotors rotate according to a drive pulse ouput from the CPU-IC 40 (described later). Furthermore, because the watch body uses a coin-type lithium battery (not shown), the coil receives a voltage of 3 V.

Below, the movement systems of the hands provided at each position on the watch face is explained.

{1} Center of Watch Face

In the central portion of the watch face, the hour hand 1, the minute hand 2, the personal rhythm display hand 11, and the condition display hand 21 are attached so as to rotate around the same axis. The composition of the movement systems of these hands is explained with reference to FIGS. 4–6.

These diagrams are cut away views of the watch body cut along three different planes. In these diagrams, 54 is a ground board which holds the watch parts fixed. Additionally, 31 is a gear sequence receiver for the guidance and support of a gear sequence. 74 is a battery.

i) Movement System for Time Display

Figure 4:
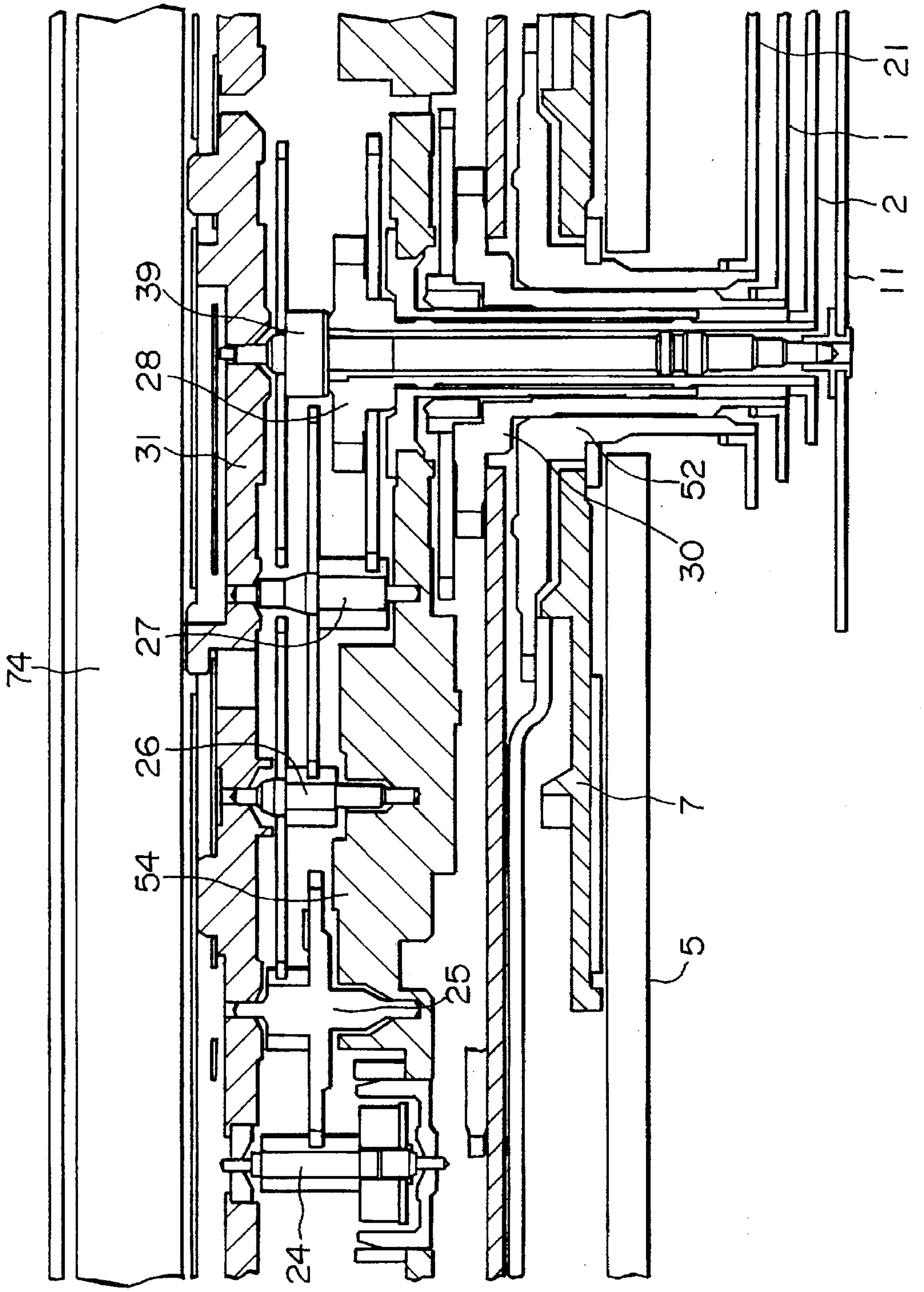
FIGS. 4–7 are cross-sectional views showing the mechanical composition of the interior of the some electronic watch with a multiple function display.

In FIG. 4, 24 is a rotor which is rotated by the step motor M1 which is rotatable in both directions. The rotational movement of this rotor 24 is conveyed to the second gear 28 via the fifth gear 25, the fourth gear 26, and the third gear 27, and thus moves the minute hand 2 which is coupled to the second gear 28.

In addition, 30 is a cylindrical gear to which the hour hand 1 is coupled. The rotational movement of the second gear 28 conveyed to the cylindrical gear 30 through a minute wheel (not shown), and the hour hand 1 is made to rotate 30 degrees for every complete rotation of the minute hand 2.

According to the above gear sequence composition, the minute and hour display of the normal time is conducted in the central position of the watch face.

ii) Movement System of the Personal Rhythm Hand 11

Figure 5:
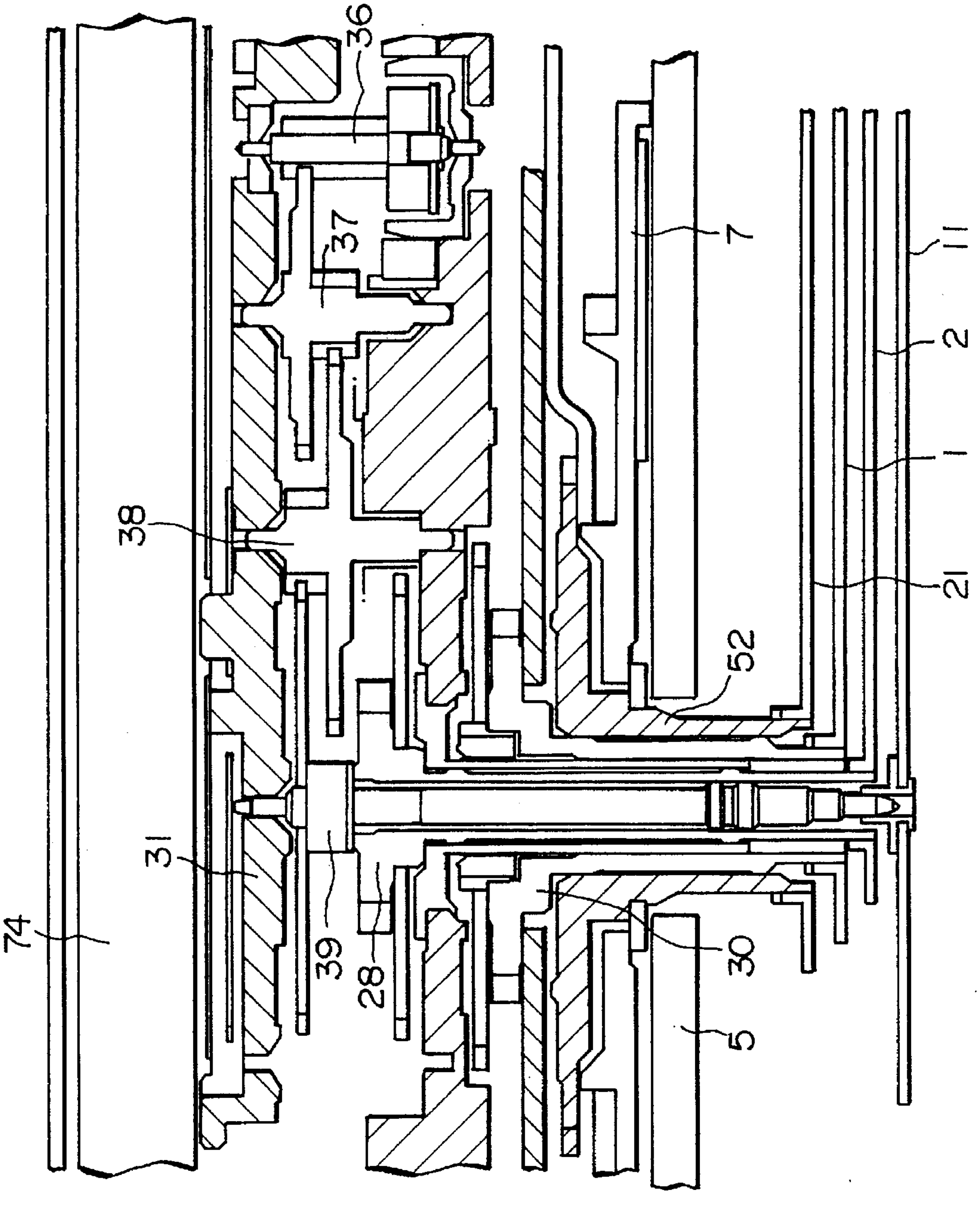

In FIG. 5, 36 is a personal rhythm rotor, which is rotated by the step motor M2 which is able to rotate in either direction. The rotational activity generated at this personal rhythm rotor 36 is conveyed to the personal rhythm display gear 39 through the personal rhythm display first intermediary gear 37 and the personal rhythm display second intermediary gear 38, and rotates the personal rhythm hand 11 coupled with the personal rhythm display gear 39.

iii) Movement System of the Condition Hand 21

The condition hand 21 is rotated by the step motor M3 which is able to rotate in both directions. The specific composition of the movement system of this condition hand 21 is identical to the movement system of the personal rhythm hand 11 and therefore is omitted from the diagram, but the rotational motion generated by the step motor M3 is conveyed to the condition display cylindrical gear 53, and thus moves the attached condition hand 21.

{2} 6 O'Clock Position

At the 6 o'clock position, the alarm minute hand 9 and the alarm hour hand 8 are attached so as to rotate around the same axis. The movement systems of these hands is shown in the cutaway diagram of FIG. 6.

Figure 6:
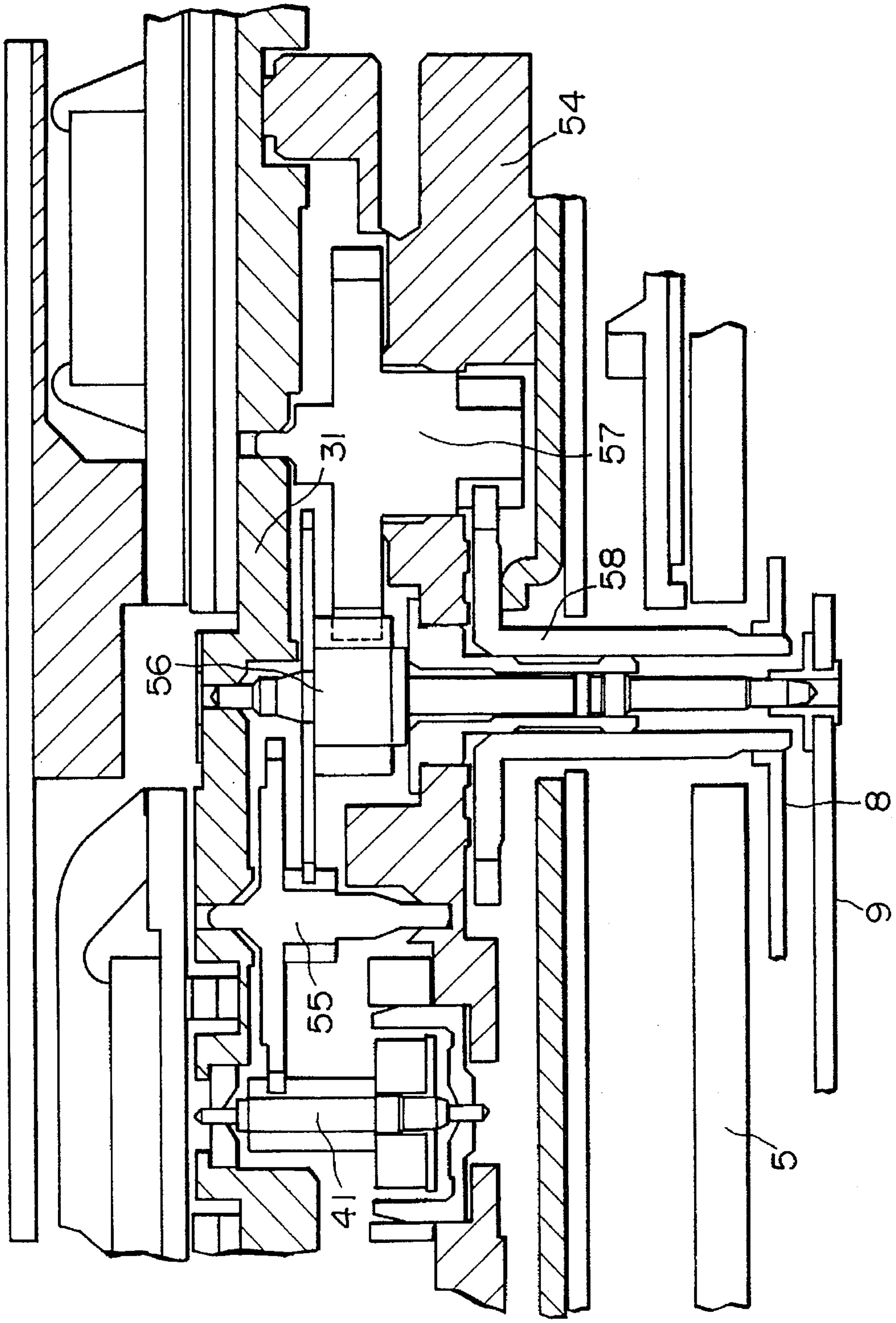

In FIG. 6, 41 is an alarm rotor, rotated by the step motor M4 which is able to rotate in either direction. The rotational motion supplied to the alarm rotor 41 is conveyed to the alarm display gear 56 through the alarm intermediary gear 55, and rotates the attached alarm minute hand 9. In addition, the rotational motion generated at the alarm display gear 56 is conveyed to the alarm cylindrical gear 58 through the alarm minute wheel 57, and the alarm hour hand is made to rotate 30 degrees for every complete rotation of the alarm minute hand.

{3} 9 O'Clock Position

Figure 7:
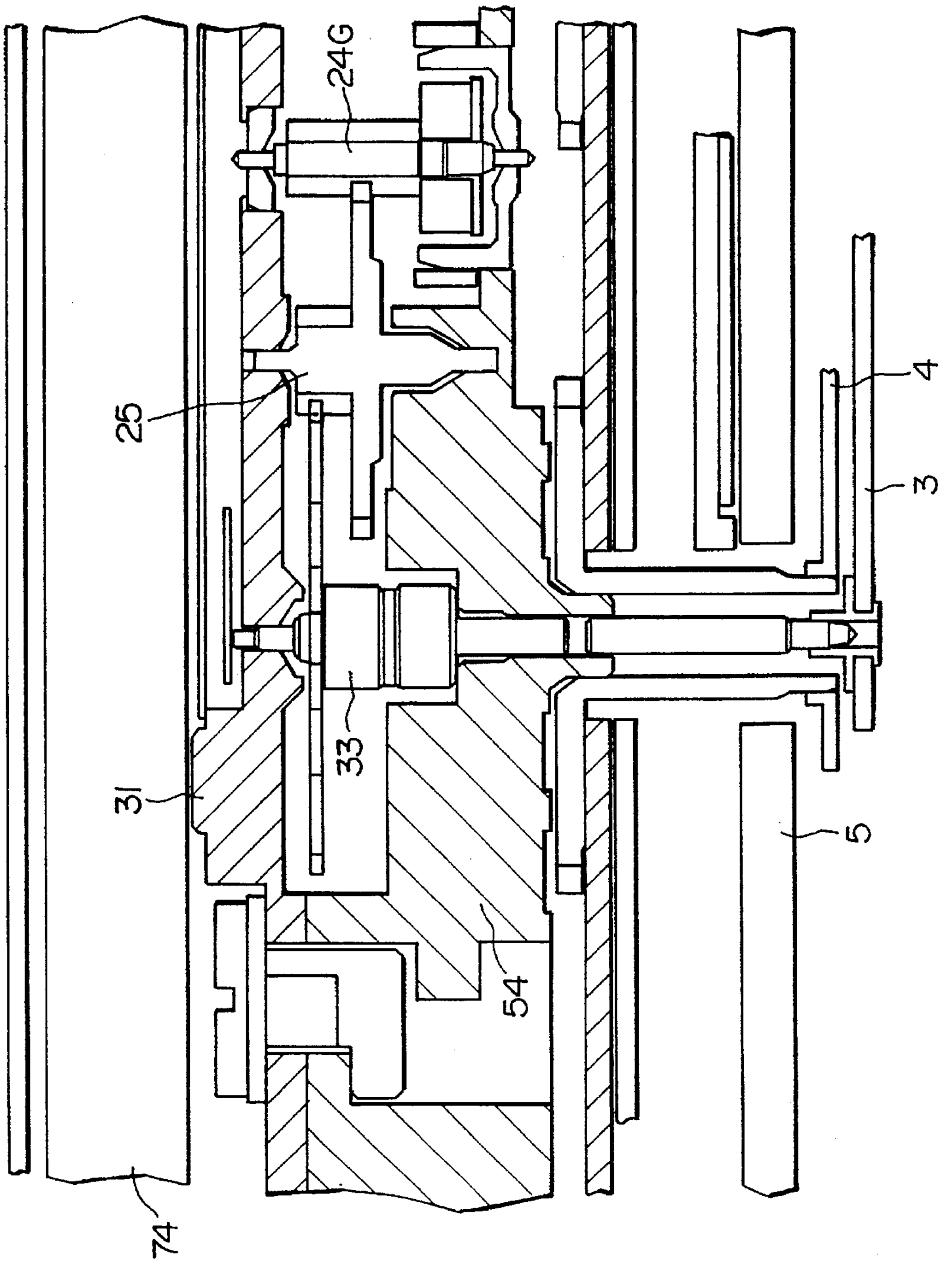

In FIG. 7, 24G is a second hand rotor, which is rotated by the step motor M5 which is capable to rotating in either direction. The rotational motion supplied to the second hand rotor 24G is conveyed to the second display gear 33 through the second intermediary gear 25, and rotates the attached second hand 3. Additionally, the rotational motion generated at the second display gear 33 is conveyed to the cylindrical gear of the 24 hour hand 4 through a minute wheel which is not shown, and the 24 hour hand 4 is made to rotate through $360/(24\times60)=2.5$ degrees for every complete rotation of the second hand 3.

{4} 12 O'Clock Position

In this position, a mechanism for a chronograph display is provided. This mechanism is composed of a step motor M6 and a gear sequence similar to those in the other positions given above, so its explanation is omitted.

(3) Circuit Composition

Figure 8:
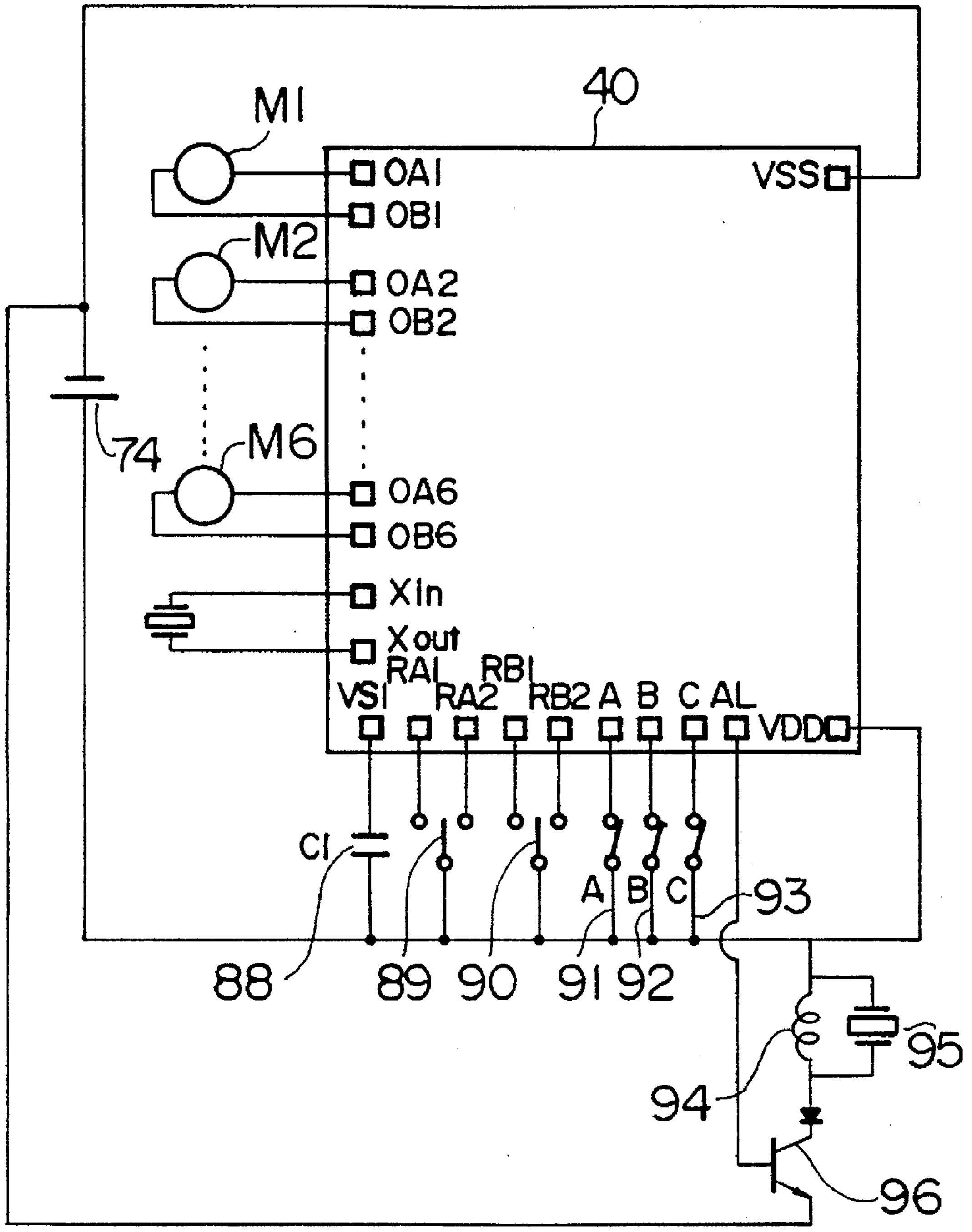
FIG. 8 is a circuit diagram of the some embodiment.

FIG. 8 shows a circuit diagram for the present embodiment. In the diagram, 40 is the CPU-IC previously mentioned, a microcomputer for analog electronic watches which integrates onto a single chip a core CPU, a program memory, a motor driver, and a motor hand control circuit. 74 is a lithium battery, and M1–M6 are coil blocks for the step motors. 87 tuning fork-shaped quartz oscillator which acts as the origin of the oscillator circuit within the CPU-IC 40, and 88 is a 0.1 μF capacitor for suppressing voltage fluctuations in the constant voltage circuit within the CPU-IC 40.

89 and 90 are switches which respond to the pulling out of the 3 o'clock crown 16 and the 4 o'clock crown 15, and 91–93 are switches which are controlled by the 2 o'clock button 12, the 10 o'clock button 13, and the 8 o'clock button 14 respectively. 94 and 96 are elements for buzzer activation, 94 being a booster coil and 96 being a transistor with a protective diode. 95 is a piezoelectric buzzer which has been attached to the back cover of the watch case. Switches 91, 92, and 93 are pushbutton type switches, and are activated only when pushed. Additionally, the switch 89 is composed so that the first coil (not shown) attached to the 3 o'clock crown moves it into contact with the electrode RA1 in the first setting, moves it into contact with the electrode RA2 in the second setting, and is left open in the normal setting. The switch 90 is composed so that the second coil (not shown) attached to the 4 o'clock crown moves it into contact with the electrode RB1 in the first setting, moves it into contact with the electrode RB2 in the second setting, and is left open in the normal setting.

Figure 9:
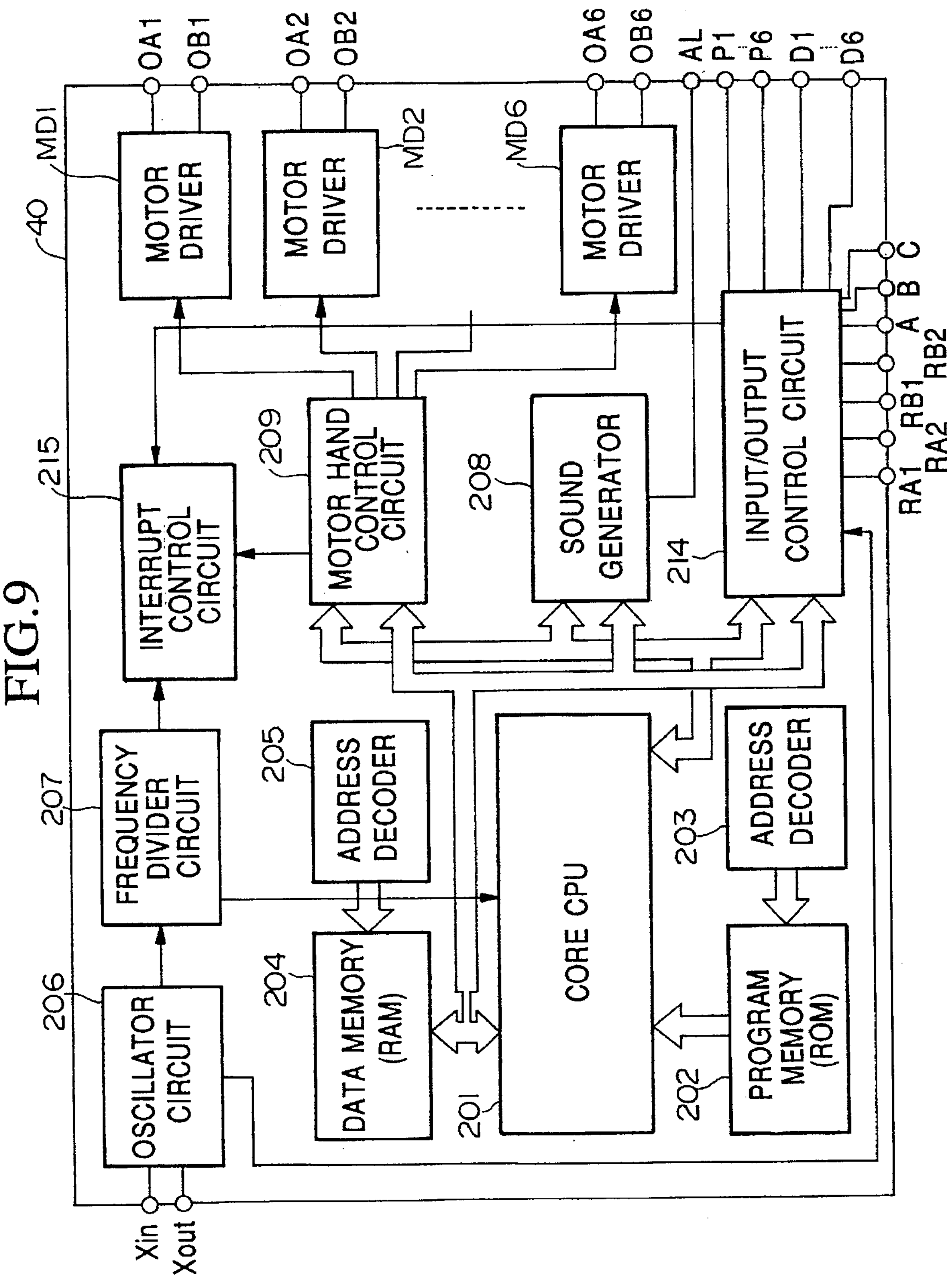
FIG. 9 is a block diagram showing the circuit composition of the CPU-IC 40 of the same embodiment.

FIG. 9 is a block diagram of the CPU-IC 40 used in the present embodiment. In FIG. 9, 201 is the core CPU, composed of an ALU, a calculation register, a stack pointer, an instruction register, and an instruction encoder, and is connected with the surrounding circuitry by a memory mapped I/O style address bus and data bus. 202 is a program memory made of a master ROM, in which is stored software for running the IC. 203 is an address encoder for setting the addresses inside the program memory 202. 204 is a data memory composed of a RAM, inside of which is stored data representing the alarm set time and the positions of the various hands. 205 is an address encoder for setting the addresses inside the data memory 204.

206 is an oscillator circuit, which oscillates at 32768 Hz with a tuning fork-shaped quartz oscillator attached to the electrodes Xin and Xout.

207 is a frequency divider circuit which divides the 32768 Hz signal output by the oscillator circuit 206 and ouputs a 1 Hz and ⅕ Hz signal (for chronograph display).

208 is a sound generator, which releases a buzzer activation signal upon a command from the core CPU 201 and outputs it to the AL electrode.

209 is a motor hand control circuit which generates rotational activation pulses and reverse rotational activation pulses upon orders from the core CPU 201, and delivers them to the motor drivers MD1–MD6. The motor drivers MD1–MD6 ouput the rotational activation pulses and the reverse rotational activation pulses generated by the motor hand control circuit 209 to the stop motors M1–M6.

214 is an input/output control circuit which controls the push-button switches A, B, and C, the crown switches RA1, RA2, RB1, and RB2, and the input electrodes D1–D5 as well as the output electrodes P2–PS. Additionally, the input/output control circuit 214 is connected to the oscillator circuit 206, and upon a command from the core CPU 201, ouputs a 32768 Hz clock signal to the electrode P1.

215 is an interrupt control circuit which is connected to the frequency divider circuit 207, the motor hand control circuit 209, and the input/output control circuit 211, and outputs timer interrupts, motor control interrupts, and key interrupts to the core CPU 201.

Figure 10:
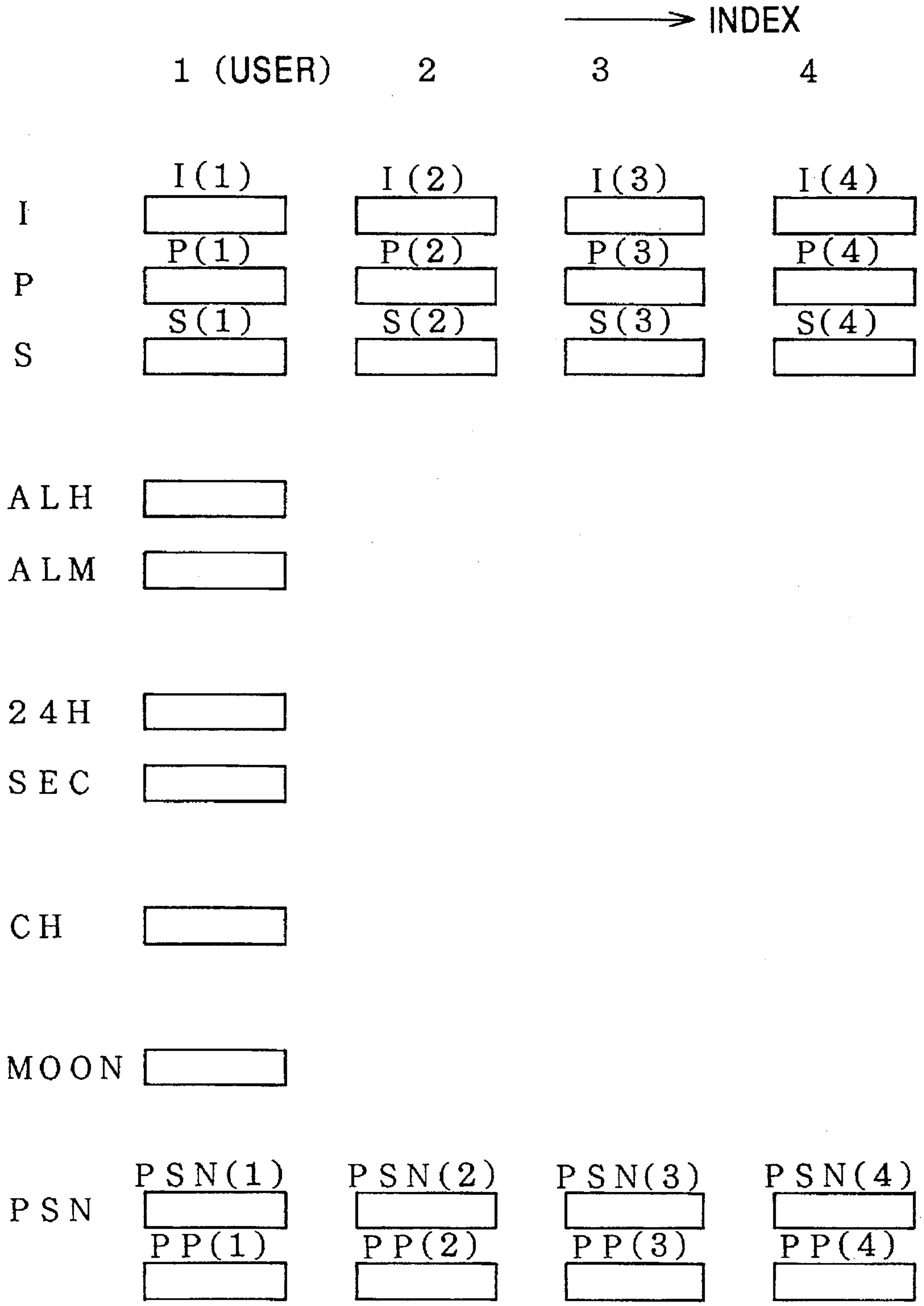
FIG. 10 is a chart showing the principal information stored in the data memory 204 of the same embodiment.

The present embodiment controls the movement of the respective hands based on data stored in the data memory. The important data are shown in FIG. 10, and their explanations are given below.

Alarm Hour Hand Data ALH: represents the position of the alarm hour hand 8

Alarm Minute Hand Data ALM: represents the position of the alarm minute hand 9

24 Hour Hand Data 24H: represents the position of the 24 hour hand

Second Hand Data SEC: represents the position of the second hand 3

Chronograph Second Data CH: represents the position of the chronograph hand 9

Moon Date Data MOON: represents the position of a hand displaying the moon date

Intellectual Rhythm Phase Data I(k) (k=1–4): represents the position of the hand when the chronograph hand is used to indicate the phase of the intellectual rhythm. The index k is used to tell whose intellectual rhythm it is, and is set according to the position of the bezel 19 in the present embodiment (same as below)

Physical Rhythm Phase Data P(k) (k=1–4): represents the position of the hand when the phase of the physical rhythm is indicated by the second hand 3

Sensual Rhythm Phase Data S(k) (k=1–4): represents the position of the hand when the phase of the sensual rhythm is indicated by the alarm minute hand 9

Personal Rhythm Phase Data PSN(k) (k=1–4): represents the position of the hand when the phase of the personal rhythm is indicated by the personal rhythm hand 11

Personal Rhythm Period Length Data PP(k) (k=1–4): represents the period length of a personal rhythm (2) Actions Next, the actions according to the present embodiment are explained.

a. Normal Display Mode

Figure 11:
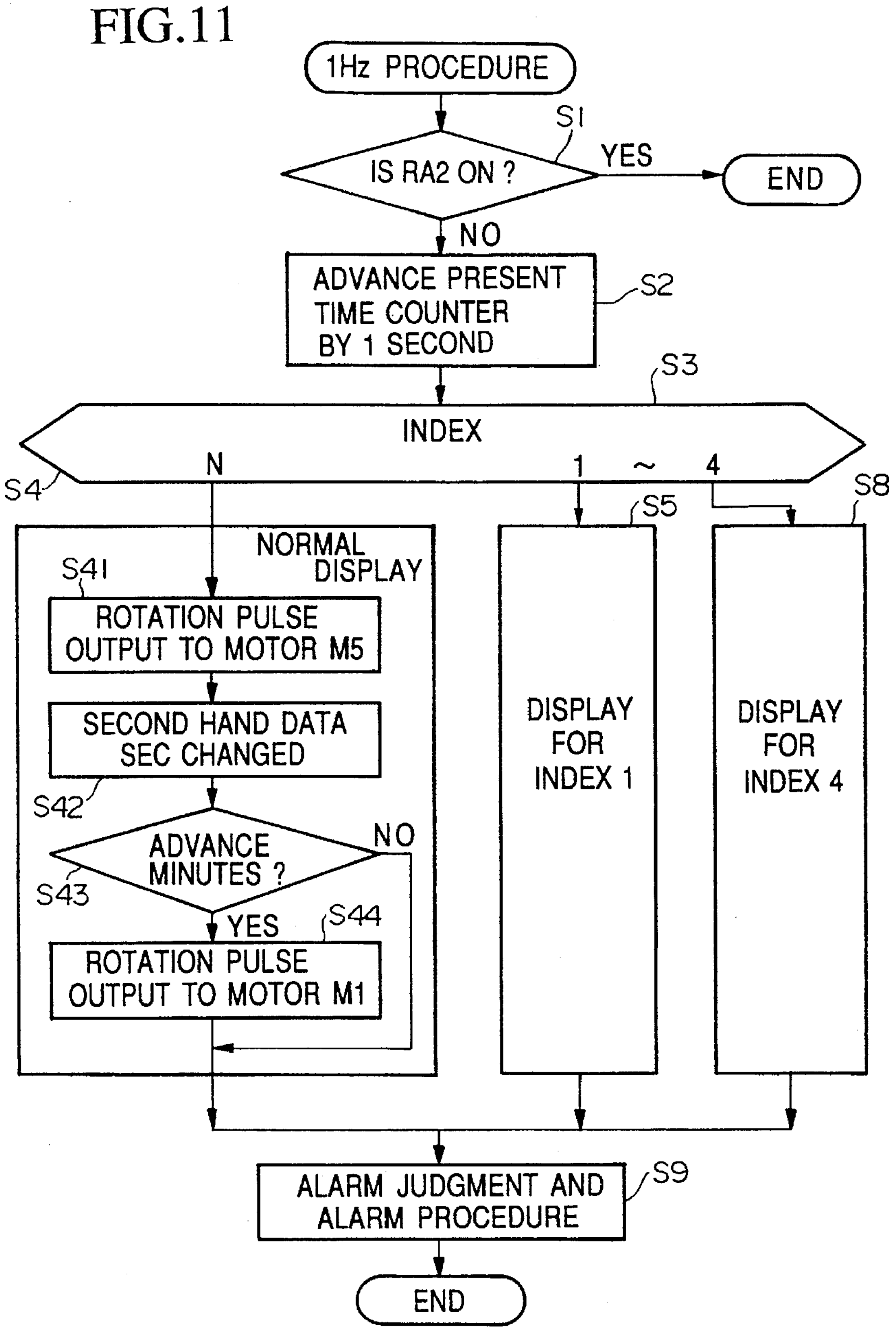
FIG. 11 is a flow chart showing the actions of the same embodiment.

For the multiple function electronic watch of the present embodiment, a timer interrupt is sent to the core CPU 201 at 1 Hz intervals, and the 1 Hz interrupt routine shown in the flow chart of FIG. 11 is performed.

First, it is determined whether or not the crown switch RA is OFF, that is, whether or not the 3o'clock crown 16 is at the second setting; if the result is "NO" then the procedure advances to the next step, and if the result is "YES", the routine is ended without performing any procedures. Upon advancing from step S1 to step S2, the core CPU 201 advances the contents of the present time counter which keeps track of the present time by one second.

Advancing to step S3, the index k set by the bezel ring 19 is determined, and the procedure advances to the step corresponding to the set index k. If the bezel ring 19 is in the neutral position, that is, if the "N" displayed on the bezel ring 19 coincides with the triangular mark positioned on its interior, the procedure advances to step S4, and the routine for the normal display mode is performed.

First, in step S41, the core CPU 201 sends a rotational activation pulse output command to the motor hand control circuit 209 in order to advance the seconds, and the motor driver MD5 outputs a rotational activation pulse to the step motor M5. As a result, the step motor moves 180 degrees in the proper direction, the second hand 3 rotates 6 degrees in the clockwise direction, and the second display is conducted. Advancing to step S42, the core CPU 201 increases the second hand data SEC inside the data memory 204 by one unit (one second). In the next step S43, it is determined whether or not there is an advancement from seconds to minutes. Then, if the result is "YES", then the procedure advances to step S44, and the core CPU 201 outputs a rotational activation pulse output command for advancing the minutes to the motor hand control circuit, a rotational activation pulse is output from the motor driver MD5 to the step motor M1, the step motor M1 rotates 180 degrees in the proper direction, and the minute display is conducted by rotating the minute hand 2 clockwise by 6 degrees. Additionally, because the hour hand 1 is moved with the minute hand 2 through a gear sequence, it is being moved simultaneously.

The entire procedure for step S2 ends as given above, and the routine advances to step S9. Then, it is determined whether or not the present time is identical to the time set for the alarm, and if the result is "YES", then the core CPU 201 outputs an alarm sounding command to the sound generator 208, which activates the alarm sounding transistor 96 and sounds the alarm by the piezoelectric element.

b. Biorhythm Display Mode

When one of the displays "1"–"4" on the bezel ring is moved to coincide with the triangular mark by the user, and when one of the indices 1–4 is chosen, then the biorhythm display mode is activated, one of the steps S5–S8 in FIG. 11 is performed, and the biorhythm display corresponding to the appropriate index is conducted by means of the chronograph hand 10, the second hand 3, and the alarm minute hand 9.

That is, if the index "1" is indicated by the bezel ring 19, the phases of the I, P, and S (the number of the day within the period) of the biorhythm of the user corresponding to the index "1" are calculated. Then, the display position for displaying the phase of the I biorhythm is compared with the display position corresponding to the chronograph second data CH, the display position for displaying the phase of the P biorhythm is compared with the display position corresponding to the second hand data SEC, and the display position for displaying the phase of the S biorhythm is compared with the display position corresponding to the alarm minute data ALM, and the amount of rotation required for the biorhythm display is determined.

For example if the S biorhythm is in its fourteenth day (corresponding to a display position of 30 minutes) and the display position of the alarm minute hand 8 corresponding to the alarm minute hand data ALM is 15 minutes, then it is necessary to advance the alarm minute hand 8 by 15 minutes. Then, this 15 minutes is determined to be the amount of rotation for the alarm minute hand 8. On the other hand, if the S biorhythm is in its zeroth day (corresponding to a display position of 0 minutes) and the display position of the alarm minute hand 8 corresponding to the alarm minute hand data ALM is 45 minutes, then it is more economical to rotate the alarm minute hand 8 backwards 15 minutes than to advance it 45 minutes. Therefore, in this case, the amount of rotation of the alarm minute hand 8 is determined as −15 minutes.

When the amount of rotation of the respective hands has been determined in this way, the core CPU 201 sends a rotational activation pulse output command or reverse rotational activation pulse output command for rotating the respective hands to the motor hand control circuit 209, and the I, P, and S biorhythms are displayed by the chronograph hand 10, the second hand 3, and the alarm minute hand 9.

Subsequently, while the index k is one of "1"–"4", the biorhythm is displayed continually.

The hand movement control for biorhythm display may be conducted in the following two manners.

i) A method whereby the hands are moved by calculating the time to which the hand will next be moved each time the needle corresponding to the respective I, P, and S rhythms is moved by one minute (360/60=6 degrees), and according to that timing the phases of the I, P, and S are increased by the set amount at regular time intervals by the interrupt procedure.

For example, if the period length of P is 23 days, in order to completely rotate the second hand 3 every 23 days, the interrupt procedure is conducted every (23 days/60=) 9.2 hours, whereupon the second hand is advanced by one minute. The same applies to the other rhythms I and S.

ii) A method whereby each hand is moved at the same time every day.

Figure 14:
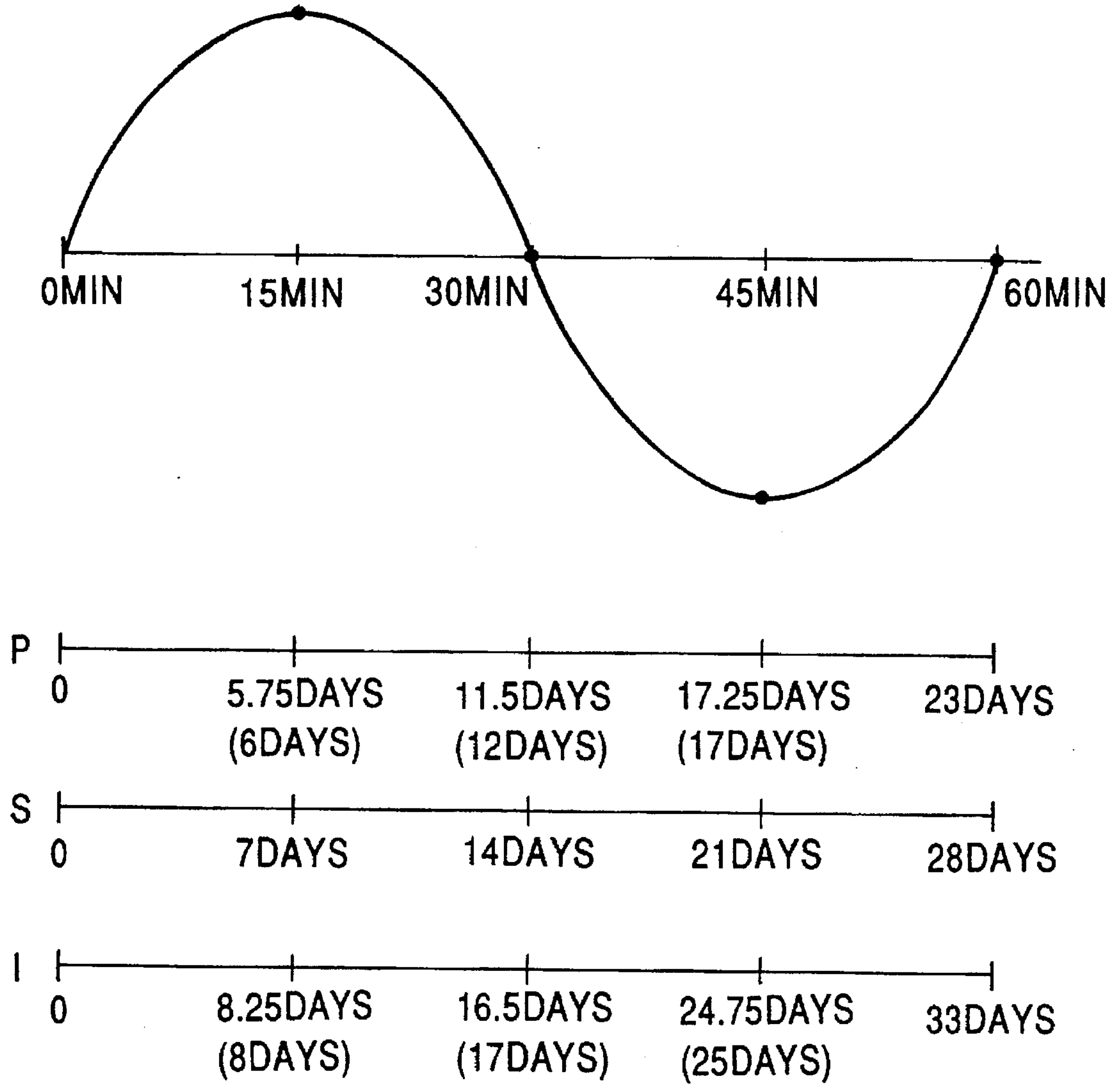
FIG. 14 is a diagram for explaining the hand movement control for the biorhythm display of the same embodiment.

FIG. 14 compares a sine wave representing a single period (60 minutes) of a biorhythm with each biorhythm P, S, and I.

If the hands are to be moved at the same time every day, the amount that each hand should advance per day would be:

for P, 60/23 ≈ 2.6 minutes,
for S, 60/28 ≈ 2.1 minutes,
for I, 60/33 ≈ 1.8 minutes.

However, since the respective hands are only able to be advanced by the minute, the positions of the hands must be determined by choosing the minute display closest to the present biorhythm phase. For example, the following control method is possible. That is, determining the position of the minute hand for each phase, i.e. the first day corresponds to x minutes, the second day corresponds to y minutes, etc., and storing them in a table. For example if the respective phases have remainders (the day cannot be expressed as an integer) then a table is made wherein the minute display is conducted on the day shown in the parentheses in FIG. 14. Then, each day, the table is referred to at a certain time, the amount the hand should be moved from the previous position is determined, and the necessary rotational activity pulse is output.

Additionally, the zero-cross points and the maximum and minimum points of the biorhythm correspond to times for which the user would want accurate knowledge.

Furthermore, it is desirable to advance the hands without any confusion around such zero-cross points and minimum and maximum points. For example, it is undesirable to have movement such that the hand moves by one minute the day before a zero-cross point, the hand moves by two minutes on the day of the zero-cross point, the hand moves by two minutes the day after the zero-cross point, etc. The table is made so that in such a case, the hand is made to advance by units of two minutes one or two days before and after the day of a zero-cross point or minimum or maximum point, and any resulting deviation of the biorhythm is corrected for at another place.

At the same time as the above biorhythm display, the value of one's condition is calculated and displayed. For example, the addition of the respective I, P, and S values mulitplied with set coeffficients may be taken as the condition value. Alternatively, the moon date may be determined and the condition value based on the respective values of the I, P, and S for this moon date. In the present embodiment, in order to make it possible to display the condition by the hands, the maximum and minimum values possible for the condition value are pre-determined, and the relationship between the condition value and the angle of rotation of the condition hand 21 is decided so that the hand is positioned at the 2 o'clock position in FIG. 3 when the condition value is at a maximum and at the 4 o'clock position when the condition value is at a minimum. Then, the calculation of the condition value is carried out simultaneously with the calculation of the biorhythm, and due to the activation of the step motor M3, the condition hand 21 is moved to the position corresponding to the calculated results.

Furthermore, the present embodiment allows the entry of a personal rhythm period by the same procedure as the one for setting the alarm, and is designed to interpret the number of days corresponding to the position of the alarm minute hand (for example, 45 days correspond to 45 minutes) as the length of a period of the personal rhythm. In the present embodiment, the personal rhythm set in this manner is displayed by the personal rhythm hand 11. That is, if the set number of days is M, each time an interval of M/60 has past, the personal rhythm hand 11 is moved by one minute. By making use of this display function, if for example the period length of one's condition is known, then the period length of that rhythm may be set as the personal rhythm, and subsequently, the present condition may be known from the personal rhythm hand 11.

c. Switching Between Display Modes

The control method when the display mode is switched over from the normal display to the biorhythm display or conversely from the biorhythm display to the normal display is explained below.

In the present embodiment, for hands which display more than two types of data, the data which represents the hand positions are stored. Some examples are the 24 hour hand data 24H, the second hand data SEC, the chronograph second data CH, the intellectual rhythm phase data I(k), the physical rhythm phase data P(k), and the sensual rhythm phase data S(k). In the present embodiment, when the hands are moved the corresponding data are always renewed, and when the display mode is switched then the hand positions are appropriately controlled with reference to the data.

For example, in the biorhythm display mode, the positions of the chronograph second hand 10, the second hand 3, and the alarm minute hand 9 are stored as the intellectual rhythm phase data I(k), the physical rythm phase data P(k), and the sensual rhythm phase data S(k). Then, when the biorhythm display mode is switched to the normal display mode, the present position of, for example, the second hand 3 is determined by referring to the physical rhythm phase data P(k), and an activation pulse is generated such that the second hand 3 may be moved to a position corresponding to the present second.

d. Changing the Display Subject

In the biorhythm display mode, one of the hands 10, 3, or 9 for displaying the biorhythm may be switched to a moon date display with the pulling out of the 3 o'clock crown or the pushing of the 10 o'clock button. That is, when the 3 o'clock crown is pulled out to the first setting, the chronograph second hand 10 repeatedly rotates over a small angle in first one direction then the other. If the 3 o'clock crown is pulled out to the second setting at this time, the chronograph second hand 10 stops quivering and displays the moon date. If the moon date is to be displayed by another hand, the 10 o'clock button 13 is pushed after pulling out the 3 o'clock crown 16 to the first setting. As a result, the second hand 3 quivers instead of the chronograph second hand 10. If the 10 o'clock button 13 is pressed once again, the alarm minute hand 9 quivers instead of the second hand 3. By making the desired hand quiver and pulling out the 3 o'clock crown 16 to the second setting, the moon date is displayed on that hand.

e. Setting the First Period of the Biorhythm

According to the present embodiment, it is possible to set the phase of the biorhythm for the desired day. That is, in the biorhythm display mode, by pulling the 4 o'clock crown 15 out to the first setting, the chronograph second hand 10 can be advanced by the 2 o'clock button 12 and reversed by the 8 o'clock button 14. By adjusting the position of the chronograph second hand 10 to one's current intellectual condition and pulling the 4 o'clock crown 15 out to the second setting, the present phase value of the intellectual rhythm can be entered into the watch. By successively pressing the 10 o'clock button 13, the other hands 3 and 9 may be moved, and in this way, it is possible to input the phase values of the physical rhythm P and the sensual rhythm S.

f. Compatibility Test

In the biorhythm display mode, it is possible to perform a compatibility test. In the case in which the compatibility of a person whose index is "1" and a person whose index is "3" is to be tested, first, with the 4 o'clock crown pulled out to the first setting, the index 1 is chosen by the bezel ring 19 and the 8 o'clock button 14 is pushed, after which the index 3 is chosen by the bezel ring and the 8 o'clock button is pushed. Next the 4 o'clock crown is pulled out to the second setting. As a result, the respective biorhythm values corresponding to index 1 and index 3 are read from the data memory, and the mutual correlation between the biorhythms of the two people corresponding to index 1 and index 3 is obtained. Based on this mutual correlation, control of the hand movements of the condition hand 21 is performed similar to the above-described procedure for the condition value, and the hand is moved to the 3 o'clock position if the compatibility is normal, to the 2 o'clock position if the compatibility is high, and to the 4 o'clock position if the compatibility is low.

Third Embodiment

Figure 12:
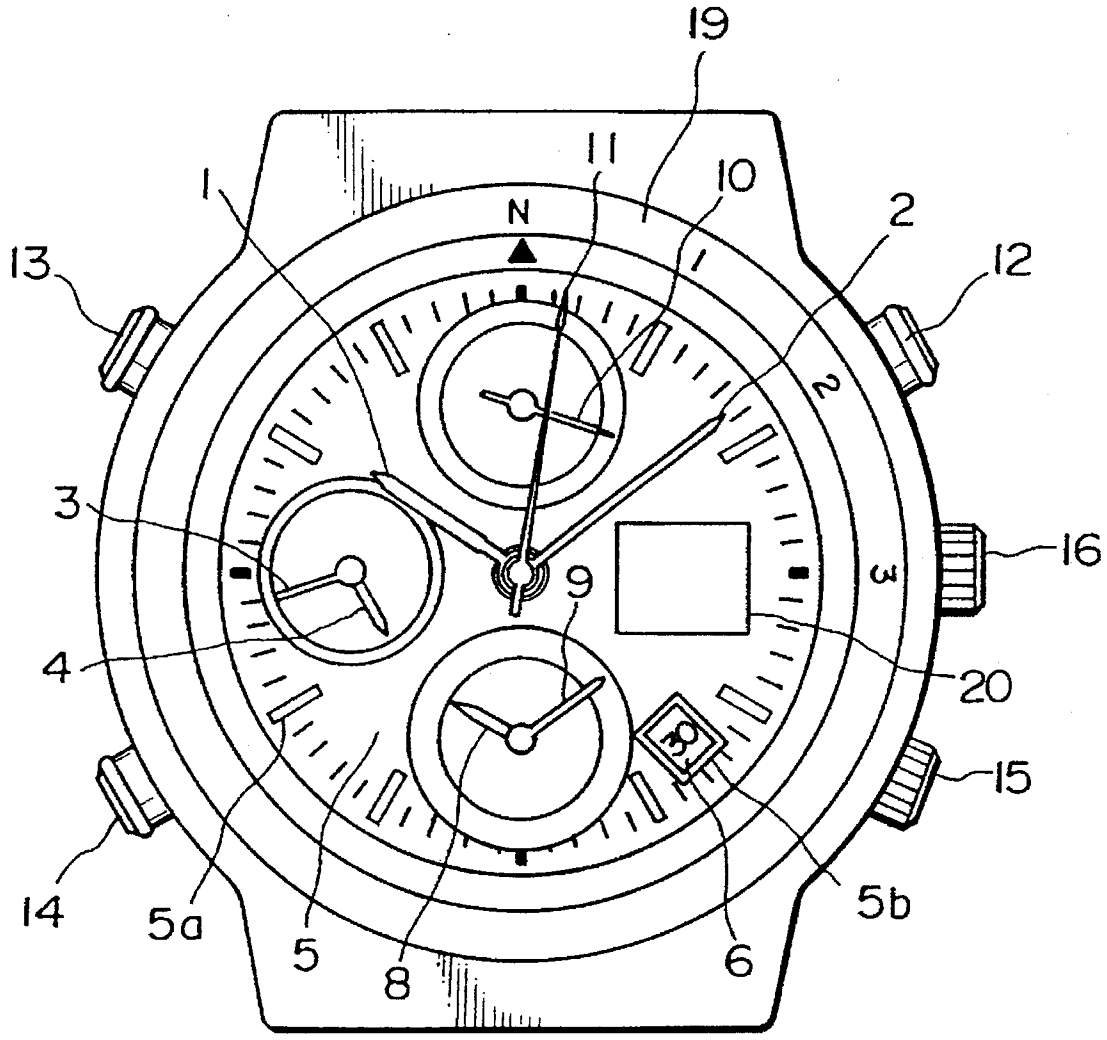
FIG. 12 is an outside view of the electronic watch with a multiple function display according to the third embodiment of the invention.

FIG. 12 is an outside view of the electronic watch with a multiple function display according to the third embodiment of the present invention. The present embodiment does away with the personal rhythm display hand 11 and the scale 22, and provides a liquid crystal display device 20 at the former position of the scale 22.

Figures 13A, 13B, 13C, 13D:
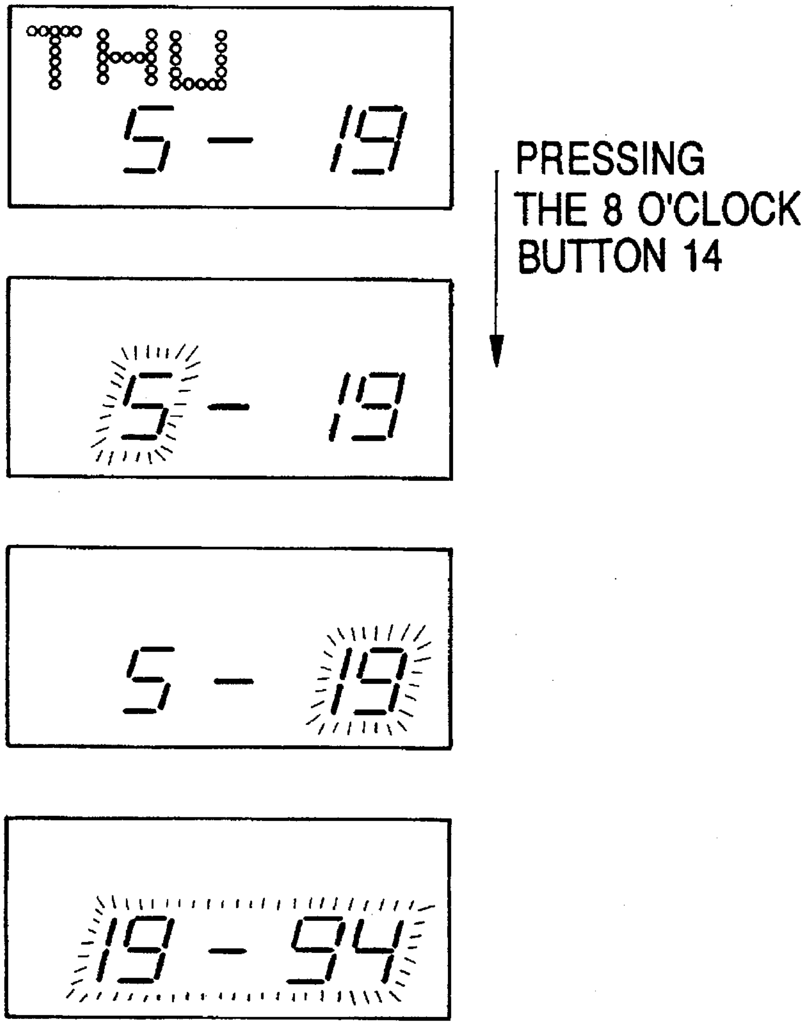
FIGS. 13A–13D are diagrams showing a display example of the liquid crystal display device of the same embodiment.

According to the present embodiment, it is possible to input one's birthday which is the date from which the biorhythm is calculated. That is, in the normal display mode and the biorhythm display mode, the day of the week and the date are displayed on the liquid crystal display device 20 as shown in FIG. 13(*a*).

When the bezel ring 19 is rotated to the biorhythm mode and the 3 o'clock crown 16 pulled out to the first setting, the birthday input mode is chosen, and the month display is flashed as shown in (b). In this state, it is possible to increase the highlighted numerical value by pressing the 2 o'clock button 12, and decrease the numerical value by pressing the 8 o'clock button 14. After adjusting the month display to the month of birth, the day display may be highlighted by pressing the 10 o'clock button 13. Then, after adjusting the numerical value to the birthdate by pressing the 2 o'clock button 12 or the 8 o'clock button 14, if the 10 o'clock button is pressed, then the present year is displayed as shown in (d). Then, after adjusting the displayed year to the year of birth by pressing the 2 o'clock button 12 and the 8 o'clock button 14, the date of birth is input by pulling the 3 o'clock crown out to the second setting. The respective present phase values of the I, P, and S of the biorhythm are calculated based on the date of birth entered in this manner, and subsequently, the respective phase values are renewed in order based on the passage of time, and displayed.

(Modification Example)

The above embodiment chooses the indices by the rotational position of the bezel ring, but the setting of the indices is not limited to this method.

For example, it is possible to use a spring or the like to hold the bezel ring in a neutral position, increase the index for a clockwise rotation of the bezel ring, decrease the index for a counterclockwise rotation of the bezel ring, and display the present index on the liquid crystal display device. In this case, it is easiest to use if the index is continually increased while the bezel ring is held to the right, and continually decreased while held to the left.

Fourth Embodiment

Figure 15:
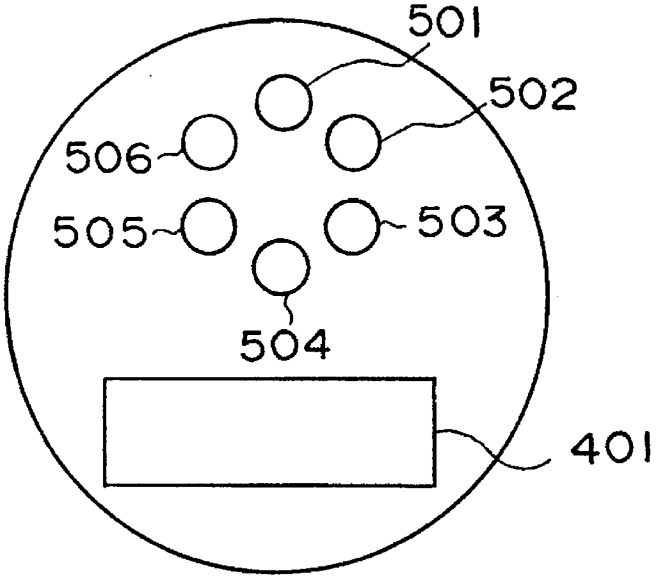
FIG. 15 is an outside view of the electronic watch with a multiple function display of the fourth embodiment of the invention.
Figure 16A:
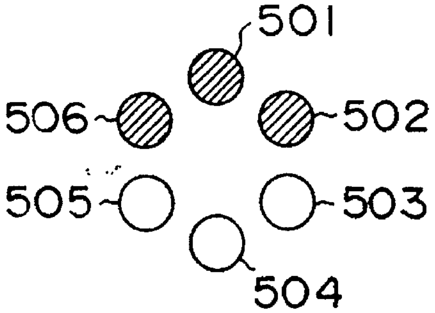
FIGS. 16A–16D are diagrams for explaining the biorhythm display control of the same embodiment.
Figure 16B:
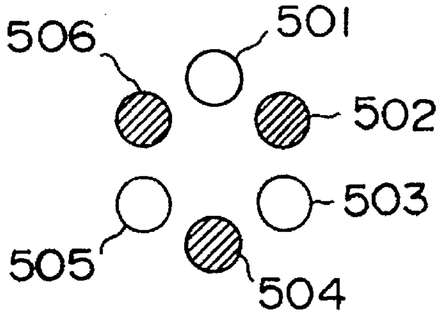
Figure 16C:
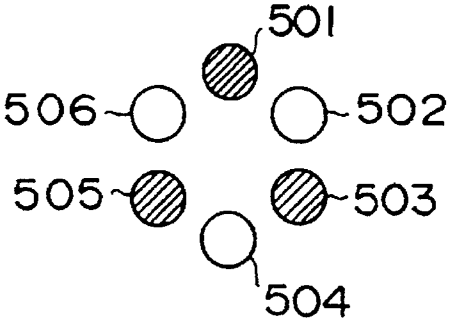
Figure 16D:
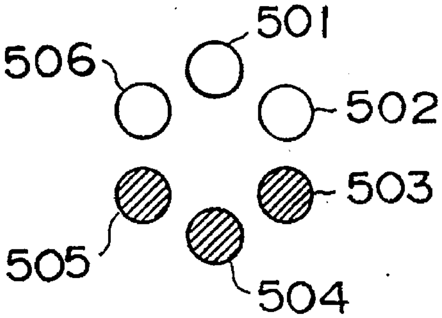

FIG. 15 shows an outside view of the fourth embodiment of the present invention. The present embodiment is provided with a liquid crystal display section 401 for displaying such information as the time and date, as well as other liquid crystal display sections 501–506. If all of the biorhythms I, P, and S are in a positive condition, the I, P, and S are each displayed on the display sections 506, 501, and 502 which are indicated by the diagonal lines in FIG. 16(*a*), and if two rhythms, such as P and S, are in a positive condition, then the display sections 506, 504, and 502 are indicated as shown in (*b*). Additionally, if only one rhythm is in a positive state, then the display sections 505, 501, and 503 are indicated as shown in (*c*), and if they are all in a negative state, then the display sections 505, 504, and 503 are indicated as shown in (*d*). Each display device 501–506 is able to display the value of its assigned rhythm with a numerical display or a pie graph.

With the present embodiment, it is possible to immediately tell one's overall condition from the display pattern of the display devices 501–506.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

I claim:

1. An electronic watch with a multiple function display, comprising:

timekeeping means for keeping track of present time including year, month and day;

rhythm calculation means for calculating a plurality of rhythms for the present time kept by said timekeeping means based on birthday information;

a plurality of display means for analog displaying said plurality of rhythms;

determination means for determining which of said plurality of rhythms is to be displayed by each of said plurality of display means based on the value of each rhythm calculated by said rhythm calculation means; and display control means for analog displaying each rhythm on a separate display means as determined by said determination means so that a single rotation corresponds to a single period of each rhythm.

2. The electronic watch of claim 1, further comprising input means for entering said birthday information and memory means for storing the birthday information entered by said input means, and said rhythm calculation means performing the calculation of said rhythms starting from the date of said birthday information.

3. The electronic watch of claim 1 wherein said birthday information includes hour information, minute information and second information in addition to year, month and date information.

4. The electronic watch of claim 1, wherein said display means include a plurality of indicator hands positioned so as to surround the centers of the watch hands on a character panel of the watch.

* * * * *